Patented Sept. 21, 1937

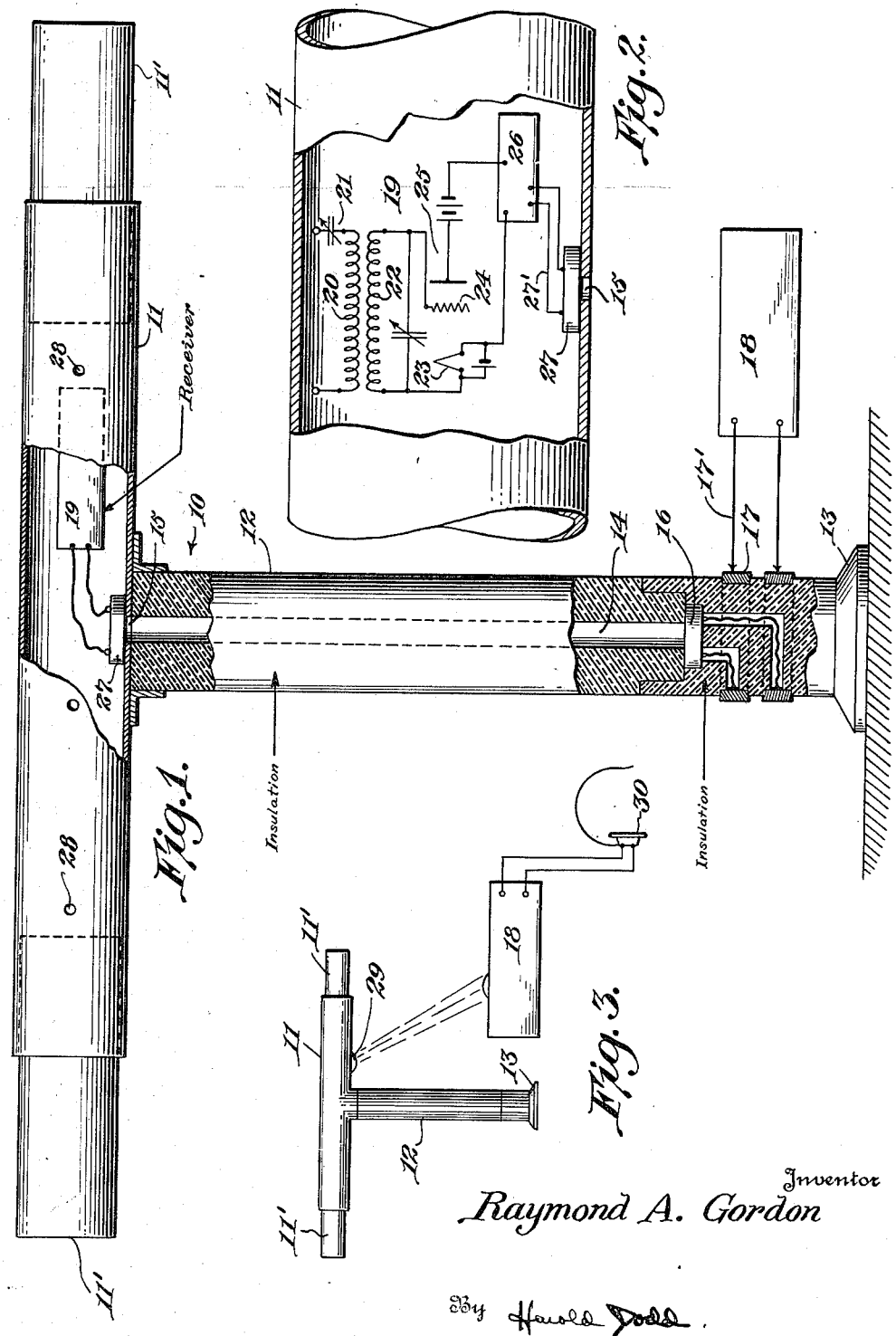

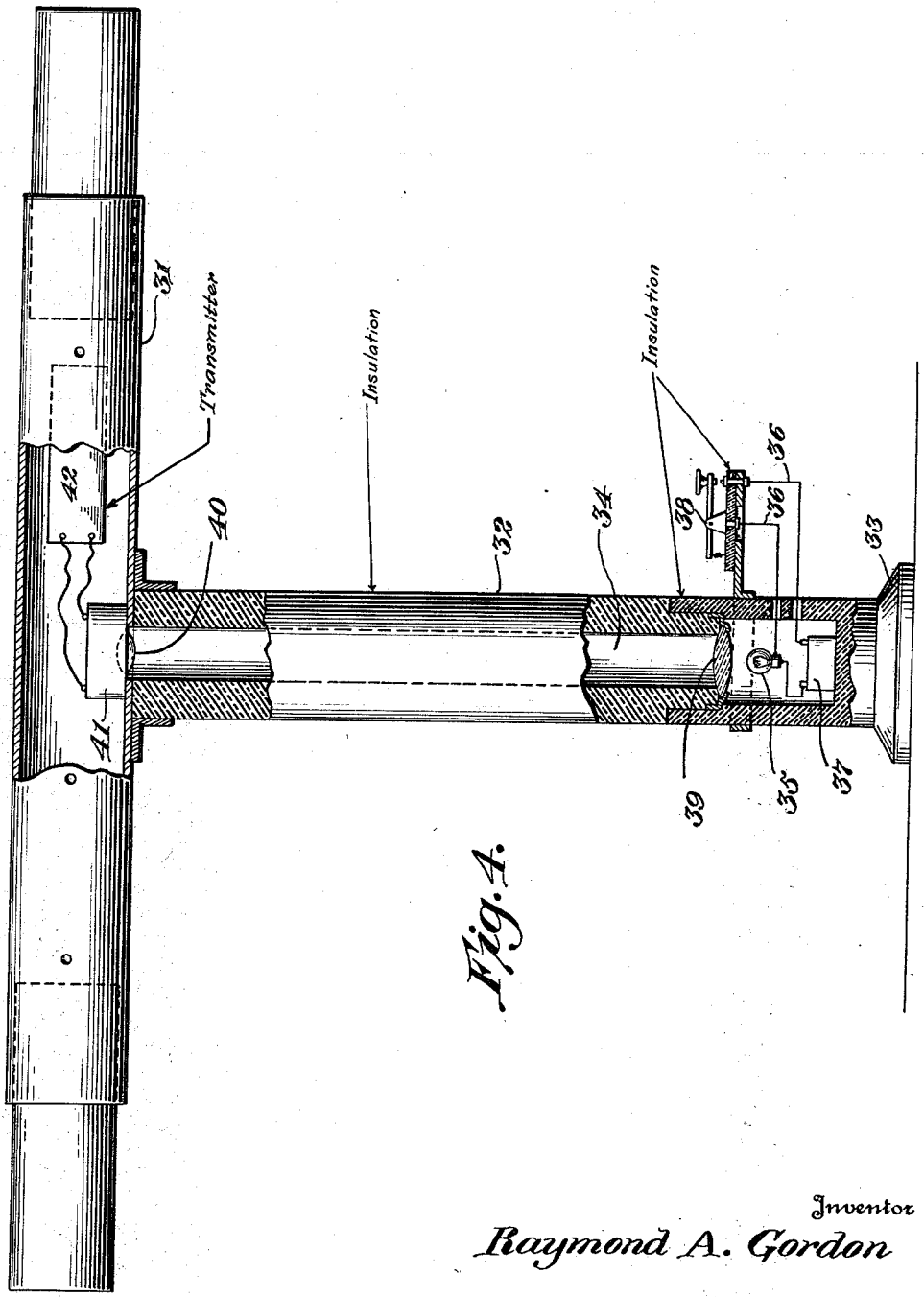

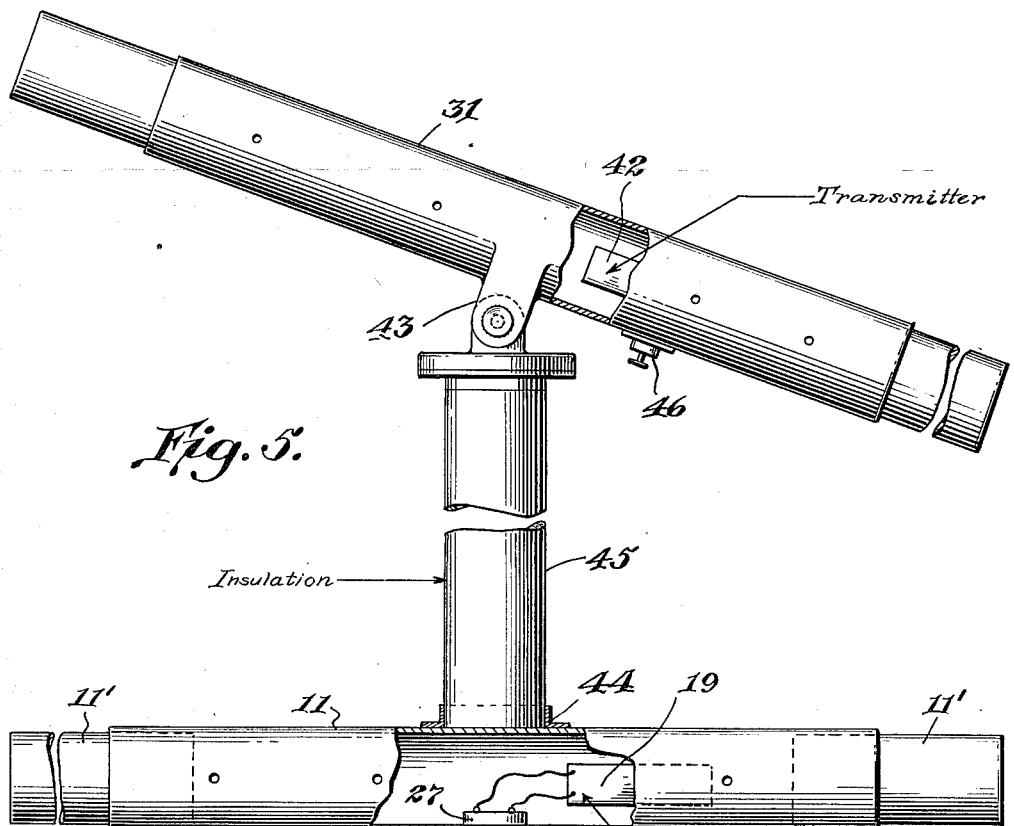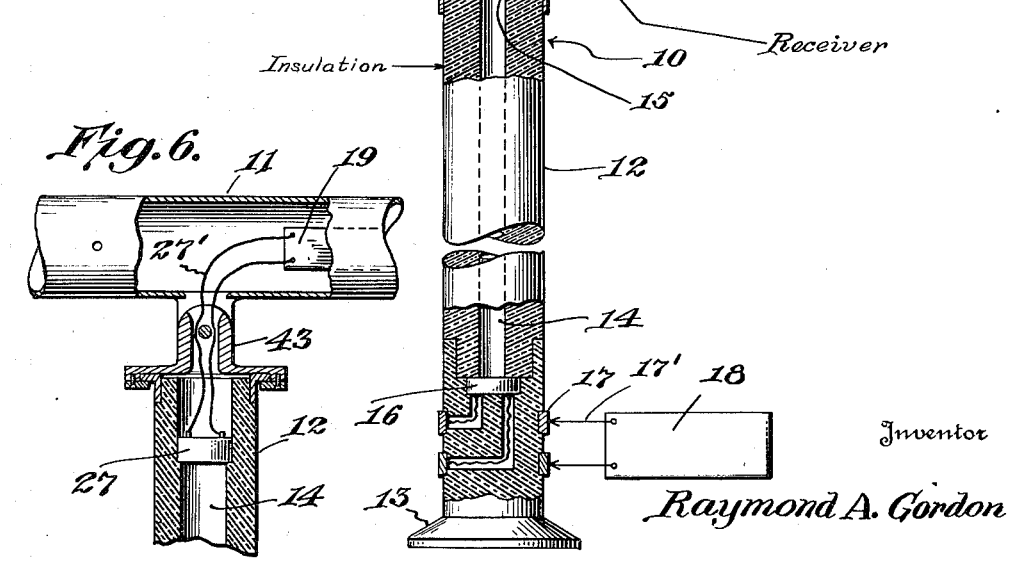

2,093,432

UNITED STATES PATENT OFFICE 2,093,432

RADIO ORIENTATOR

Raymond A. Gordon, Mount Rainier, Md.

Application December 29, 1933, Serial No. 704,477

11 Claims. (Cl. 250—11)

(Granted under the act of March 3, 1883, as amended April 30, 1928; 370 O. G. 757)

This invention relates to means for determining the direction of propagation of radio waves and of the components thereof, and for determining the bearing of a point of reception with respect to a point of transmission or reflection of radio waves.

The invention is particularly adapted to the utilization of radio waves which are now quite generally classified as short waves.

It is well known to those familiar with the art of radio communication that metallic conductors connecting an antenna and a radio receiver are in the field of influence of the radio wave and are, in effect, a part of the antenna system. It has also been known that such conductors form an unwanted part of the antenna system because they "pick-up" an undesired component of the propagated wave. They are also undesirable in that they are subject to the influence of neighboring objects, such as the body of an observer, and seriously impair the usefulness of the antenna as an instrument of precision.

It is the prime object of this invention to provide a radio receptor unit which includes an antenna and a radio receiver positioned in free space, a signal indicator or amplifier spaced apart from the receptor so that in its operation it will not affect the stability, tuning or potential of the receptor, and means whereby said receptor actuates said indicator without the intervention of connecting wires, or the like, so that the electrostatic potential of the indicator does not disturb that of the receptor and does not impair the direction-finding ability of the receptor. In brief, the invention contemplates a signal indicating or amplifying unit, a radio receiving unit in free space to actuate the indicating unit, and means whereby the amplifying unit and the receptor unit cooperate for the reception of a signal at one point and its amplification at another point without the potential of one unit being capable of disturbing that of the other unit in the normal functioning of the combination.

It is an object of the present invention to provide means for the utilization of radio waves which means comprise an indicating device which is substantially at ground potential, and means for the reception of radio waves adapted to control the indicating device and positioned in free space, that is, not connected to the indicating device by conducting wires or their equivalent, and isolated from objects at ground potential.

It is an object of this invention to provide means for the utilization of radio waves which means comprise an indicating device responsive to energy transmitted at frequencies other than that of the radio wave to be detected, and means to be positioned in free space to actuate the indicating device, the latter means including a radio receiver responsive to radio waves of the frequency to be detected, and a transmitter or reproducer responsive to the receiver.

It is also an important object of this invention to provide a transmitting unit comprising a signal producer which may be positioned on the ground for manual operation to actuate a radio transmitter positioned in free space and which is electrically insulated from the signal producer. A portable transmitting unit is contemplated which unit may comprise a mast of insulating material, an antenna at the top of the mast, a radio transmitter also at the top of the mast, and a signal producer placed conveniently at the bottom of the mast for manual operation to actuate the transmitter but without being connected to it by metallic conductors or the like.

It is an object of this invention to provide a receptor which includes an antenna and a radio receiver to be positioned in free space, a signal indicator or amplifier which may be positioned so as to have substantially the potential of ground, and means whereby said receiver actuates said indicator without the intervention of wires so that the receptor is maintained isolated or in free space relation with respect to the indicator.

It is an object of this invention to provide a radio orientator comprising an antenna adapted to be positioned in free space, and a radio receiver, or transmitter, cooperable therewith and housed in the antenna.

It is an important object of this invention to provide a unit of communication which comprises a receptor and a transmitter in free space relation to each other on a common insulating support, and being adjustable in their spaced relation to each other.

Other objects of the invention will appear in the specification hereinafter with reference to the accompanying drawings, and in which similar numerals have been applied to similar elements.

In order to better explain the invention, Figures 1 to 6 of the drawings show, by way of example, several of its practical embodiments.

In Figure 1 there is shown a radio orientator 10, which comprises a metallic tube 11, supported by a rod 12, of insulating material, which rod is seated for movement in a base 13. The rod 12 is provided with a bore 14 which communicates with the interior of the tube 11 through an opening 15 in the tube.

A microphone 16 is positioned in a recess formed at the lower end of the rod 12, and it is suitably connected through contact rings 17 and by wires 17' to a signal indicating and amplifying device 18, which is properly enclosed by a metal shielding cabinet.

A radio receiver 19 is housed within the tube 11, and is suitably connected thereto to be responsive to radio waves received by the tube 11, and, in one form of the invention, means are embodied in the receiver to transmit signals by sound along the bore 14.

The tube 11 is an antenna, and the length of the antenna may be varied by adjusting the extended length of the extending members 11' which are slidable in the tube 11.

All of the batteries or other source of energy necessary for the functioning of the receiver 19 are housed in the tube 11.

It will now be clear that there is shown a signal indicator or amplifier which may be connected to be at ground potential, or substantially at ground potential, an antenna isolated from the indicator and in free space relation thereto, and means cooperable with the antenna to actuate the signal indicator and which means are housed by the antenna and are also in free space relation to the indicating device. Thus, there are no wires connecting the receiver to the indicator, and no physical means to form an excrescence on the antenna to impair the usefulness of the device by picking up unwanted components of the propagated radio wave, and by detuning the antenna system under the influence of the body of the observer as he moves about in taking bearings. Thus the electrical symmetry of the antenna is undisturbed by ground or other conducting surfaces.

In Figure 2 there is indicated diagrammatically a simple circuit between the antenna 11 and the receiver, indicated generally by the numerals 19, to avoid confusion of lines. It will be obvious to those familiar with the art that the input circuit of the receiver may be variously connected to the antenna. A tuning coil 20 has its ends connected to spaced points on the antenna 11, in series with a condenser 21. Another coil 22 is coupled to the first coil, and the coil 22 is connected to the cathode 23 and to the grid 24 of an electronic tube. Connected in the plate circuit 25 of the electronic tube is a suitable electronic device 26 to actuate a signal producing device 27 connected thereto by wires 27', and which signal producing device 27 may be a magnetic type of reproducer, to emit sounds to be carried by way of the bore 14 to the microphone 16.

The embodiment of the invention in the form shown in Figure 1 possesses advantages of practical importance in that the microphone 16 is protected against climatic conditions, and the bore 14 may be formed to provide such a form of acoustic coupling between the reproducer 27 and the microphone 16 that selective tuning is provided for signals of a desired audio frequency and signals or sounds at other audio frequencies are appreciably filtered out. It will be clearly understood, however, that other energy responsive means may be substituted for the microphone 16, and may be variously positioned with respect to the transmitting means 27 and to the indicating means 18, provided that there is no physical connection between the receiver 19 and the pick-up device 16 of a kind to form an excrescence on the antenna or influence the stability, functioning or potential of the antenna.

Apertures 28 are provided in the antenna 11 at suitable points so that tools may be entered therethrough to facilitate adjustment of the components of the receiver 19 to tune it to the radio frequency being employed.

As is indicated in Figure 3, a light source 29 responsive to the signals detected by the receiver 19 may be employed to actuate the indicating device 18 through a beam of light so that the signals may be heard by an observer wearing the "head-phones" 30 at a point remote from the antenna 11. While in Figure 1 the indicating device 18 is shown as being contiguous to the ground and the antenna 11 is shown as being supported on an insulator resting on the ground, it will be understood that the invention is not limited to use on, or contiguous to, the ground but may be used on aeroplanes and ships.

It will also be understood that other mediums than sound or light waves may be employed to render the indicating device 18 cooperable with the receiver 19 and its shielding antenna 11 to automatically indicate or record signals received by the antenna receptor unit while maintaining the indicating device 18 and the receptor unit in isolated relation to each other so that in the normal functioning of the combination the potential of the indicating unit will not disturb that of the receptor unit, and vice versa.

In Figure 4 there is shown a transmitting unit comprising a metallic tube 31 mounted on a rod or mast 32 of insulating material which is seated for movement in a base 33. The rod 32 is provided with a bore 34 communicating with the interior of the tube 31 through an opening in the tube.

A recess is formed in the lower end of the rod, and in the recess there is placed a light source 35 which is connected by wires 36 to a battery 37 and to a transmitting key 38 suitably mounted on the rod. Light from the light source 35 passes by way of a suitable lense 39, the bore 34, and a lense 40, at the upper end of the rod, to a photo-electric cell 41 which is suitably connected to modulate the output of a radio-transmitter 42 positioned within the tube 31, and connected thereto so that the tube functions as the antenna of the transmitting unit.

The batteries necessary for the operation of the transmitter 42 are housed within the tube 31.

The transmitting unit shown in Figure 4 is self-contained and may readily be made portable for service in the field. The tube 31 and the rod 32 may be so proportioned that they may be shipped from point to point in telescoped relation to each other in a package adapted for ease in handling.

It will be understood that other primary actuating sources may be substituted for the light source 35. A sound producing device may be substituted for the light source 35 and a cooperable sound actuated microphone may be substituted for the light sensitive device 41, and which would amount to a reversal of the position of the sound transmitting and receiving elements shown in Figure 1.

A modified form of the mounting of the receptor unit of Figure 1 is shown in Figure 6. The bore 14 of the rod 12 is increased at the upper end of the rod to house the reproducer 27, and the leads 27' connecting the reproducer with the receiver 19 are flexible. The antenna 11 is connected to the rod 12 by a suitable universal joint 43 so that the antenna may be tilted with respect to the rod and may be turned about the vertical axis of the rod. The showing is merely indicative of means to permit tilting and turning of the antenna on the rod, and no claims are directed to the specific form of joint shown. The showing of the reproducer 27 within the rod 12 is merely suggestive, and it will be understood that the reproducer 27 may be positioned within the antenna 11 provided that means are employed to ensure satisfactory transmission of the signal from the reproducer 27 to the pick-up device 16 when the antenna is tilted. When the reproducer is positioned as shown in Figure 6 due care is taken to shield the leads 27'.

In Figure 5 there is shown a unit of communication which comprises a receptor and a transmitter mounted on a common insulating support. The receptor unit is similar to that shown in Figure 1, and described in connection therewith, and on the tube 11 there is mounted a suitable base 44 in which there is positioned a vertical rod 45, of insulating material. A tubular transmitter antenna 31 is connected to the rod 45 by a suitable universal joint 43, and the antenna houses a transmitter 42. The transmitter of Figure 5 differs from that of Figure 4 in that no provision is made for sending code signals because, in certain uses of the unit, it may be desirable that the transmitter 42 be put into operation by means of a switch 46, secured to the antenna 31, to send a steady signal.

While a steady signal is being sent by the transmitter 42 the antenna 31 is gradually tilted until there is no local or direct reception of the signal and then the receptor unit is responsive only to the transmitted signal when reflected back to the receptor from a distant reflecting or signal deviating body or medium.

It will be obvious that, when the use to which the unit is put makes it desirable, provision may be made for sending code signals by the means indicated in connection with the transmitter shown in Figure 4.

In a preferred form of the unit shown in Figure 5 the rod 45 is of the same length as that of the rod 12.

It will now be obvious that the antennae described herein, with their respective receiving and transmitting units housed therein, are supported in free space, that is, they are free of wires extending beyond the antennae for purposes of power supply, control or relaying, and have no conductive connection with conductive members responsive to interfering signals at radio-frequency, and are sufficiently remote from external conductive members to be uninfluenced thereby.

I am aware that numerous details of construction may be varied through a wide range without departing from the principles of this invention, and I therefore do not purpose limiting the patent granted, otherwise than necessitated by the prior art.

The invention herein described may be manufactured and used by or for the Government of the United States of America for governmental purposes without the payment of any royalties thereon or therefor.

What is claimed is:

1. An antenna positioned in free space and tuned for the reception of signals at a radio frequency, means carried by the antenna and responsive to signals received by the antenna to reproduce the signals at another frequency, an insulating support for said antenna adapted to guide signals at said another frequency, and means positioned in spaced and insulated relation to said first means arranged responsive to signals guided by said support.

2. An antenna adapted to be positioned in free space relative to the ground, a radio receiver in said antenna, an indicating device adapted to be positioned at ground potential, and insulating means supporting said antenna and said device and adapted to guide signals to actuate said device in response to signals received by said antenna.

3. An insulating support adapted to be positioned on a surface at ground potential, an antenna carried supported by said insulating support and in free space relation to said surface, a radio receiver carried supported by said insulating support and in free space relation to said surface, means connecting said receiver to said antenna, an indicating device adapted to be positioned at ground potential, and insulating means including said support connecting said receiver and said indicating device for the transmission of signal energy to actuate said device in response to signals received by said antenna.

4. A hollow metallic antenna responsive to radio waves of a given frequency, a first means housed by said antenna and connected thereto responsive to waves of the same frequency, a second means housed by said antenna responsive to energy waves of another frequency, a third means at a point remote from said second means and in insulated relation thereto arranged cooperable with said second means for the transmission of signals, and insulator means connecting said second means and said third means to guide and direct signal energy therebetween.

5. In combination, an antenna, a radio transmitter including an energy source therefor connected to and housed within said antenna, an elongated insulating support for said antenna, said support being provided with insulating means arranged to provide a non-metallic channel for signals, and means cooperable with said channel and in insulated relation to said transmitter to control the output of said source of energy to said transmitter.

6. A tubular antenna, a first energy converting means including a source of energy connected to and entirely housed within said antenna, an elongated insulating support for said antenna, said support being provided with a central bore adapted to provide a channel for signals, means in said antenna connecting said first converting means and said channel, a second energy converting means including a source of energy in spaced and insulated relation to said antenna, and means in said bore connecting said second converting means and said channel for the transmission of signals between said first and said second energy converting means.

7. A tubular antenna, a first energy converting means including a source of energy connected to and housed within said antenna, an elongated insulating support for said antenna, said support being provided with a central bore adapted to provide an air column as a channel for signals, a second energy converting means including a source of energy positioned in spaced and insulated relation to said antenna, a first device in said antenna connected to said first energy converting means and arranged cooperable with said air column for the transmission of signals along said column, and a second device connected to said second energy converting means and arranged cooperable with said first device through said air column, said second device being in spaced and insulated relation to said first device.

8. In a signal transmission system an antenna adapted to be positioned in free space relative to the ground, a radio transmitter, and signal reproducing means in said antenna, a signalling device adapted to be positioned at ground potential, insulating means supporting said antenna and said device, and adapted to guide signals to actuate said reproducing means in response to signals impressed on said signalling device.

9. An insulating support adapted to be positioned on a surface at ground potential, an antenna carried supported by said insulating support and in free space relation to said surface, a radio transmitter carried supported by said insulating support and in free space relation to said surface, means connecting said transmitter to said antenna, a signaling device adapted to be positioned at ground potential, and insulating means including said support connecting said transmitter and said signalling device for the transmission of signal energy to actuate said transmitter in response to operation of said signalling device.

10. A high frequency radio receiver comprising a directional antenna, a detector connected thereto and signal indicator means associated with said detector, power supply means for said detector, all being rotatable as a unit and insulated from ground, said antenna comprising a hollow metallic structure inclosing said detector, signal indicator means and power supply means whereby the electrical symmetry of said antenna is maintained constant during rotation thereof.

11. A device for detecting the orientation of a radio wave comprising a continuous metallic housing rotatable in azimuth and elevation, the surface of said housing acting as a wave collector, the interior of said housing containing wave receiving, detecting, and indicating means, said housing being supported on an insulating structure serving to electrically isolate said housing from ground or other adjacent conducting surfaces.

RAYMOND A. GORDON.